United States Patent [19]

Matsuo et al.

[11] 4,362,637
[45] Dec. 7, 1982

[54] GRAIN BOUNDARY LAYER DIELECTRIC CERAMIC COMPOSITIONS

[75] Inventors: Yoshihiro Matsuo, Neyagawa; Gen Itakura, Hirakata; Shoichi Ikebe, Miyazaki; Tatsuya Wada, Moriguchi, all of Japan

[73] Assignee: Matsushita Electric Industrial Co. Ltd., Osaka, Japan

[21] Appl. No.: 249,885

[22] Filed: Apr. 1, 1981

[30] Foreign Application Priority Data

Apr. 11, 1980 [JP] Japan .................................. 55/48366

[51] Int. Cl.$^3$ .......................... H01B 3/12; C04B 35/46
[52] U.S. Cl. ............................ 252/62.3 BT; 252/520; 252/521; 501/136
[58] Field of Search ................ 252/62.3 BT, 520, 521; 501/136, 139

[56] References Cited

U.S. PATENT DOCUMENTS

| | | | |
|---|---|---|---|
| 3,350,212 | 10/1967 | Fujiwara | 501/136 |
| 3,666,505 | 5/1972 | Hoffman et al. | 252/62.3 BT X |
| 4,073,846 | 2/1978 | Masumura et al. | 501/136 |
| 4,143,207 | 3/1979 | Itakura et al. | 252/521 X |
| 4,237,084 | 12/1980 | Payne et al. | 252/520 X |

*Primary Examiner*—Jack Cooper
*Attorney, Agent, or Firm*—Burgess, Ryan and Wayne

[57] ABSTRACT

Grain boundary layer dielectric ceramic compositions comprising semiconductive ceramic grains having a composition of 50.23 to 49.47 mol % of SrO and CaO, 49.72 to 50.23 mol % of $TiO_2$, 0.05 to 0.3 mol % of $Nb_2O_5$, substantially each of said grains being surrounded by grain boundary layer dielectric materials which are formed by grain boundary diffusion of a mixture having a composition of 93.5 to 8.5 mol % of $Bi_2O_3$, 4.5 to 45 mol % of $Cu_2O$, 0.5 to 4 mol % of $MnO_2$, 1 to 8.5 mol % of $B_2O_3$, 0.5 to 17 mol % of $La_2O_3$, and below 17 mol % of $TiO_2$.

These ceramic compositions provide capacitors having a temperature coefficient of capacitance less than ±15%, an apparent dielectric constant higher than 35,000, a dielectric loss less than 0.01 and a breakdown voltage higher than 500 V/mm; or capacitors having a temperature coefficient of capacitance less than ±10%, an apparent dielectric constant higher than 20,000, a dielectric loss less than 0.01 and a breakdown voltage higher than 700 V/mm; or capacitors having a temperature coefficient of capacitance less than ±5%, an apparent dielectric constant higher than 5,000, a dielectric loss less than 0.01 and a breakdown voltage higher than 700 V/mm.

3 Claims, No Drawings

GRAIN BOUNDARY LAYER DIELECTRIC CERAMIC COMPOSITIONS

BACKGROUND OF THE INVENTION

The present invention relates to materials for capacitors; that is, grain boundary layer dielectric ceramic compositions in which diffusing agents mainly consisting of $Bi_2O_3$, $Cu_2O$, $MnO_2$, $B_2O_3$, $La_2O_3$ and $TiO_2$ are thermally diffused into the grain boundaries of a semiconductive ceramic mainly consisting of $SrTiO_3$ or the solid solution of $Sr_{1-x}Ca_xTiO_3$ so that the dielectric layers are formed in the grain boundaries.

The grain boundary layer dielectric ceramic compositions which are used for the manufacture of capacitors comprise a semiconductive ceramic composition and a diffusing composition which forms dielectric layers in the grain boundaries of the semiconductive ceramic composition to form a composition having high resistance. The characteristics of capacitors, therefore, are dependent upon the selection of the semiconductive ceramic compositions and the diffusing compositions.

The semiconductive ceramic compositions in accordance with the present invention mainly consisting of $SrTiO_3$ containing $Nb_2O_5$ or a solid solution of $Sr_{1-x}Ca_xTiO_3$ and containing $Nb_2O_5$. The semiconductive ceramic compositions consisting of $SrTiO_3$ containing $Nb_2O_5$ are well known in the art as disclosed in Japanese Laid-Open Patent Application Ser. Nos. 129896/1974 and 8099/1975, but as the diffusing agents or compositions which are diffused into the grain boundaries of such semiconductive ceramic compositions so as to form the dielectric layers, only $Bi_2O_3$ (as disclosed in Japanese Laid-Open Patent Application Ser. No. 129896/1974) and the compositions consisting of $Nb_2O_5$ and ZnO (as disclosed in Japanese Laid-Open Patent Application Ser. No. 8099/1975) are known. The diffusing agents or compositions in accordance with the present invention are characterized by consisting of five constituents of $Bi_2O_3$, $Cu_2O$, $MnO_2$, $B_2O_3$ and $La_2O_3$ or consisting of six constituents of the above-described compounds plus $TiO_2$. Meanwhile, the diffusing agents or compositions containing $Bi_2O_3$ and $Cu_2O$ and $MnO_2$ are disclosed in Japanese Laid-Open Patent Application Ser. No. 78494/1974, but the combinations consisting of the five or six constituents in accordance with the present invention had not been disclosed. The semiconductive ceramic composition disclosed in the abovedescribed Patent Application consists of $SrTiO_3$ containing $MnO_2$ and $Nb_2O_5$ or the solid solution thereof and is different from the semiconductive ceramic compositions in accordance with the present invention.

Based on the variations in electrostatic capacitance due to temperature variations, grain boundary layer dielectric ceramic capacitor elements are rated as YR, YB and YA. That is, the capacitor elements which have a temperature coefficient of capacitance of ±15% between +85° C. and −25° C. based on a capacitance at 20° C. are rated as YR. Those which have the temperature coefficient of ±10% are rated as YB and those which have the temperature coefficient of ±5% are rated as YA. Regardless of their ratings, all the capacitor elements preferably have a high dielectric constant $\epsilon_a$, a high dielectric breakdown voltage $V_b$ and a low dielectric loss tan δ. In practice, the YR rated capacitor elements must have dielectric constant $\epsilon_a$ higher than 35,000, a dielectric breakdown voltage $V_b$ higher than 500 V/mm and a dielectric loss tan δ of less than 0.01. The YB rated capacitor elements must have a dielectric constant $\epsilon_a$ higher than 20,000, a dielectric breakdown voltage $V_b$ higher than 700 V/mm and a dielectric loss tan δ of less than 0.01. The YA rated capacitor elements must have a dielectric constant $\epsilon_a$ higher than 5000, a dielectric breakdown voltage $V_b$ higher than 700 V/mm and a dielectric loss tan δ of less than 0.01.

DESCRIPTION OF THE INVENTION

The grain boundary layer dielectric ceramic capacitors in accordance with the present invention can satisfy all the characteristics required in practice. The semiconductive ceramic compositions which are especially recommended for the fabrication of YR rated ceramic capacitor elements consist of from 50.23 to 49.47 mol% of SrO, from 49.72 to 50.23 mol% of $TiO_2$ and from 0.05 to 0.3 mol% of $Nb_2O_5$ or consist essentially of the above-described constituents and contains less than 0.2 mol parts of $SiO_2$ based on 100 mol parts of the main constituents. The semiconductive ceramic compositions for YB rated ceramic capacitor elements consist of from 50.23 to 34.47 mol% of SrO and less than 15 moL% of CaO, the contents of the constituents SrO and CaO being from 50.23 to 49.47 mol%, from 49.72 to 50.23 mol% of $TiO_2$ and from 0.05 to 0.3 mol% of $Nb_2O_5$ or mainly consist of the above-described constituents. The semiconductive ceramic compositions for YA rated capacitor elements consist of from 35.23 to 26.87 mol% of SrO, from 15 to 22.6 mol% of CaO, the contents of the constituents SrO and CaO being from 50.23 to 49.47 mol%, from 49.72 to 50.23 mol% of $TiO_2$ and from 0.05 to 0.3 mol% of $Nb_2O_5$, or mainly consist of the above-described constituents and further contain less than 2 mol parts of $SiO_2$ based on 100 mol parts of the main constituents.

The semiconductive ceramic compositions in accordance with the present invention for YR, YB and YA rated capacitor elements contain from 0.05 to 0.3 mol% of $Nb_2O_5$. $Nb_2O_5$ is the constituent needed, based upon the principle of the valence control, to render $SrTiO_3$ consisting of SrO and $TiO_2$ or of the solid solution of $Sr_{1-x}Ca_xTiO_3$ consisting of SrO, CaO and $TiO_2$ semiconductive. However, when the contents of $Nb_2O_5$ is less than 0.05 mol% (about 0.02 mol% based on the contents of $SrTiO_3$ or $Sr_{1-x}Ca_xTiO_3$), sufficient semiconductive properties cannot be attained in $SrTiO_3$ or the solid solution of $Sr_{1-x}Ca_xTiO_3$. On the other hand, when $Nb_2O_5$ exceeds 0.3 mol% (about 0.6 mol% based on the contents of $SrTiO_3$ or $Sr_{1-x}Ca_xTiO_3$), the grain growth of $SrTiO_3$ or $Sr_{1-x}Ca_xTiO_3$ is inhibited. In addition, the semiconductive ceramic compositions will have a high specific resistance. Thus, the addition of $Nb_2O_5$ in excess of 0.3 mol% is not preferable. When the SrO constituent is substituted by the CaO constituent in $SrTiO_3$ which is the main constituent of semiconductive ceramic, the temperature coefficient of capacitance will be decreased with increase in contents of the CaO constituent and the grain sizes are in general reduced after sintering. When the CaO constituent exceeds 22.6 mol% (this corresponds almost to $Sr_{0.55}Ca_{0.45}TiO_3$) the grain size after sintering becomes less than 5 μm so that a minimum apparent dielectric constant $\epsilon_a$ of 5000 cannot be attained. When the combined contents of SrO and CaO exceeds 50.23 mol% or when the $TiO_2$ constituent is less than 49.72 mol%, the grain size after sintering will become small, so that a minimum apparent dielectric constant $\epsilon_a$ of 5000 cannot be attained. Furthermore, when the contents of SrO and CaO is less than 49.47 mol% or when $TiO_2$ exceeds 50.23 mol%, the grain size will become small, so that a minimum apparent dielectric constant $\epsilon_a$ of 5000 cannot be attained. The reason is that when the SrO, CaO and $TiO_2$ constituents are present in excess of certain contents in $SrTiO_3$ or $Sr_{1-x}Ca_xTiO_3$, the grain growth is inhibited during sintering.

The $SiO_2$ constituent has the effect of not only facilitating the formation of the semiconductive ceramic of $SrTiO_3$ or $Sr_{1-x}Ca_xTiO_3$ (so that the main sintering temperatures can be lowered) but also slightly lowering the dielectric loss tan $\delta$. However, when the $SiO_2$ constituent exceeds 2 mol parts based on 100 mol parts of the main composition consisting of three or four constituents of SrO, CaO, $TiO_2$ and $Nb_2O_5$, the grain growth is considerably inhibited, so that the average grain size of greater than 5 $\mu$m cannot be obtained. (That is, a minimum apparent dielectric constant $\epsilon_a$ of 5000 cannot be attained.)

The diffusing compositions in accordance with the present invention which are thermally diffused into the grain boundaries of the semiconductive ceramic are characterized by consisting of five or six constituents of from 93.5 to 8.5 mol% of $Bi_2O_3$, from 4.5 to 45 mol% of $Cu_2O$, from 0.5 to 4 mol% of $MnO_2$, from 1 to 8.5 mol% of $B_2O_3$, from 0.5 to 17 mol% of $La_2O_3$ and less than 17 mol% of $TiO_2$. The results of experiments conducted by the inventors show that when the content of the $Bi_2O_3$ constituent is high in the grain boundaries after thermal diffusion, the dielectric constant $\epsilon_a$ becomes high, but the dielectric breakdown voltage $V_b$ becomes low and the temperature coefficient of capacitance (between 85° C. and −25° C.) becomes high. On the other hand, when the $Cu_2O$ constituent is increased, the temperature coefficient of capacitance becomes low, the dielectric breakdown voltage $V_b$ becomes high and the dielectric constant $\epsilon_a$ becomes low. The $Bi_2O_3$ constituent in excess of 93.5 mol% or the $Cu_2O$ constituent less than 4.5 mol% is not preferable because a minimum dielectric breakdown voltage $V_b$ of 500 V/mm cannot be attained. Furthermore, the $Cu_2O$ constituent in excess of 45 mol% or the $Bi_2O_3$ constituent less than 8.5 mol% is not preferable because the dielectric constant of higher than 5000 cannot be obtained. (This minimum dielectric constant cannot be attained even when semiconductive ceramic has a relatively large average grain size of greater than about 20 $\mu$m.)

The addition of the $MnO_2$ constituent results in the increase in dielectric breakdown voltage $V_b$, slight decrease in dielectric circuit $\epsilon_a$ and an increase in dielectric loss tan $\delta$. It is preferable that the contents of the $MnO_2$ constituent is less than 4 mol% because when the $MnO_2$ constituent exceeds 4 mol%, the dielectric loss tan $\delta$ of less than 0.01 cannot be obtained. Furthermore, the $MnO_2$ constituent less than 0.5 mol% will not contribute to the increase in the dielectric breakdown voltage $V_b$.

The presence of the $B_2O_3$ constituent has the effect of decreasing the dielectric loss tan $\delta$. The contents of the $B_2O_3$ constituent is preferably less than 8.5 mol% because when the contents is in excess of 8.5 mol%, the breakdown voltage $V_b$ higher than 500 V/mm cannot be attained. On the other hand, when the $B_2O_3$ constituent is less than 1 mol%, the dielectric loss tan $\delta$ cannot be reduced to a satisfactory level.

The $La_2O_3$ constituent has the effect of reducing the temperature coefficient of capacitance, but when the $La_2O_3$ constituent exceeds a certain amount, the dielectric constant $\epsilon_a$ will be drastically lowered and the dielectric breakdown voltage $V_b$ will also be decreased. When the $La_2O_3$ constituent exceeds 17 mol%, the YR rating requirements that the breakdown voltage $V_b$ is higher than 500 V/mm and the dielectric constant $\epsilon_a$ be higher than 35,000 as well as the YB rating requirements that the breakdown voltage $V_b$ be higher than 700 V/mm and the dielectric constant $\epsilon_a$ be higher than 20,000 cannot be met. On the other hand, when the $La_2O_3$ constituent is less than 0.5 mol%, there is no effect at all of lowering the temperature coefficient of capacitance.

When the $TiO_2$ constituent is present with the $La_2O_3$ constituent, the temperature coefficient of capacitance can be further decreased, but when the $TiO_2$ constituent exceeds 17 mol%, both the dielectric constant $\epsilon_a$ and the dielectric breakdown voltage $V_b$ are lowered. Thus, the $TiO_2$ constituent in excess of 17 mol% is not preferable.

As described above, the grain boundary layer dielectric ceramic compositions in accordance with the present invention can completely satisfy the YR, YB and YA requirements. For instance, the present invention provides a YR rated capacitor element which has a temperature coefficient of capacitance of less than ±15%, a dielectric constant $\epsilon_a$ of between 40,000 and 60,000, a dielectric breakdown voltage $V_b$ of between 600 and 1300 and a dielectric loss tan $\delta$ of between 0.003 and 0.005. The present invention can also provide a YB rated capacitor element which has a temperature coefficient of capacitance of less than ±10%, a dielectric constant $\epsilon_a$ of between 20,000 and 35,000, a dielectric breakdown voltage $V_b$ of between 1,000 and 2,000 V/mm, and a dielectric loss tan $\delta$ of between 0.003 and 0.005. The present invention can further provide a YA rated capacitor element which has a temperature coefficient of capacitance of less than ±5%, a dielectric constant $\epsilon_a$ of between 7,000 and 20,000, a dielectric breakdown voltage $V_b$ of between 2,000 and 4,000 V/mm and a dielectric loss tan $\delta$ of between 0.003 and 0.005.

Next some examples will be described.

EXAMPLE 1

$SrCO_3$ powder (with a purity higher than 97.5%), $CaCO_3$ powder (with a purity higher than 98%), $TiO_2$ (anatase type, with a purity higher than 98.5%) and $Nb_2O_5$ powder (with a purity higher than 98%), all of which are for industrial use and available in the market), were proportioned as shown in TABLE 1 and mixed by a wet mixing process. After being dried, the semiconductive ceramic compositions were pre-sintered at 1200° C. and then crushed into the powder with an average grain size of 2.5 $\mu$m. An aqueous solution of polyvinyl alcohol was added as a binder. After being passed through a sieve of 32 mesh, the compositions were pressed under a pressure of about one ton/cm² into disks 15 mm in diameter and 0.5 mm in thickness. The disks were heat-treated in the air at 1000° C. and then sintered at 1,390° C. for four hours in the flow of a gas mixture consisting of 95% of $N_2$ and 5% of $H_2$, whereby semiconductive ceramic disks about 12.5 mm in diameter and about 0.4 mm in thickness were obtained. The disk was then fractured and the fractured surface was polished and etched for observation through a microscope so as to measure the grain size. The results were shown also in TABLE 1. Even when the sintering temperature was varied between 1,380° and 1,400° C., the average grain size remained unchanged.

TABLE 1

| Specimen No. | Compositions (in mol %) of semiconductive ceramic | | | | Average grain size in $\mu m$ |
|---|---|---|---|---|---|
| | SrO | CaO | $TiO_2$ | $Nb_2O_3$ | |
| 11* | 49.99 | — | 49.99 | 0.02 | 6.8 |
| 13* | 50.30 | — | 49.65 | 0.05 | 3.3 |
| 14 | 50.23 | — | 49.72 | 0.05 | 7.4 |
| 16 | 49.87 | — | 50.08 | 0.05 | 22 |
| 21* | 50.15 | — | 49.65 | 0.20 | 3.4 |
| 22 | 50.08 | — | 49.72 | 0.20 | 7.7 |
| 24 | 49.80 | — | 50.00 | 0.20 | 30 |
| 25 | 49.75 | — | 50.05 | 0.20 | 24 |
| 27 | 49.57 | — | 50.23 | 0.20 | 7.5 |
| 28* | 49.50 | — | 50.30 | 0.20 | 4.2 |
| 31 | 49.75 | — | 49.95 | 0.30 | 24 |
| 34 | 49.47 | — | 50.23 | 0.30 | 6.3 |
| 35* | 49.40 | — | 50.30 | 0.30 | 3.7 |
| 44* | 49.60 | — | 50.00 | 0.40 | 4.7 |
| 65 | 47.25 | 2.5 | 50.05 | 0.20 | 23 |
| 81* | 44.99 | 5.0 | 49.99 | 0.02 | 6.1 |
| 86 | 44.87 | 5.0 | 50.08 | 0.05 | 19 |
| 91* | 45.15 | 5.0 | 49.65 | 0.20 | 3.2 |
| 92 | 45.08 | 5.0 | 49.72 | 0.20 | 6.9 |
| 95 | 44.75 | 5.0 | 50.05 | 0.20 | 21 |
| 96 | 44.70 | 5.0 | 50.10 | 0.20 | 15 |
| 97 | 44.57 | 5.0 | 50.23 | 0.20 | 7.0 |
| 98* | 44.50 | 5.0 | 50.30 | 0.20 | 3.8 |
| 101 | 44.75 | 5.0 | 49.95 | 0.30 | 20 |
| 104 | 44.47 | 5.0 | 50.23 | 0.30 | 6.9 |
| 105* | 44.40 | 5.0 | 50.30 | 0.30 | 3.6 |
| 114* | 44.70 | 5.0 | 50.00 | 0.40 | 4.4 |
| 134 | 39.80 | 10.0 | 50.00 | 0.20 | 23 |
| 135 | 39.75 | 10.0 | 50.05 | 0.20 | 18 |
| 154 | 34.80 | 15.0 | 50.00 | 0.20 | 17 |
| 155 | 34.75 | 15.0 | 50.05 | 0.20 | 12 |
| 171* | 32.49 | 17.5 | 49.99 | 0.02 | 3.8 |
| 176 | 32.37 | 17.5 | 50.08 | 0.05 | 10 |
| 184 | 32.30 | 17.5 | 50.00 | 0.20 | 12 |
| 185 | 32.75 | 17.5 | 50.05 | 0.20 | 7.2 |
| 191 | 32.25 | 17.5 | 49.95 | 0.30 | 8.6 |
| 204* | 32.20 | 17.5 | 49.90 | 0.40 | 2.8 |
| 224 | 27.20 | 22.6 | 50.00 | 0.20 | 6.1 |
| 254* | 25.00 | 25.0 | 50.00 | 0.20 | 4.2 |

*specimens used for comparison.

Except the specimen Nos. 11 and 171, the specific resistance measured at 20° C. with In-Ga electrodes was between 0.2 and 0.5 ohm.cm. Specimen Nos. 11 and 171 showed high specific resistance of 3.5 and 8.5 ohm.cm, respectively, which means that the valance-controlled semiconductive properties are not sufficient. The grain growth of specimen Nos. 44, 114 and 204 whose $Nb_2O_5$ contents were in excess of 0.30 mol% was inhibited, so that the average grain size was small and less than 5 $\mu m$.

Further, the grain growth of specimen No. 13 whose SrO content was in excess of 50.23 mol%, specimen Nos. 35 and 105 whose SrO and $TiO_2$ contents were less than 49.47 mol%, specimen Nos. 13, 21 and 91 whose $TiO_2$ content was less than 49.72 mol%, specimen Nos. 35, 98 and 105 whose $TiO_2$ content was in excess of 50.23 mol% was inhibited, so that the average grain size was small and less than 5 $\mu m$.

The fact that the CaO contents in excess of 22.6 mol% is not preferable was proved by the specimen No. 264 whose grain size was less than 5 $\mu m$. Except the specimen Nos. 13, 21, 28, 35, 44, 91, 98, 105, 114, 171, 204 and 254, the average grain sizes were greater than 5 $\mu m$.

The semiconductive ceramic disks which had average grain sizes greater than 12 $\mu m$ were coated with a diffusing agent or composition in a paste form and were subjected to heat-treatment at 1150° C. for two hours, so that dielectric layers were formed in the grain boundaries. In like manner, the semiconductor ceramic specimens which had an average grain size of less than 12 $\mu m$ were coated with a diffusing agent or composition in the form of paste and were subjected to heat-treatment at 1000° C. for two hours, so that dielectric layers were formed in the grain boundaries. The diffusing agent or composition used was a six-constituent composition consisting of 67.6 mol% of $Bi_2O_3$, 12.0 mol% of $Cu_2O$, 2.4 mol% of $MnO_2$, 6.0 mol% of $B_2O_3$, 4.0 mol% of $La_2O_3$ and 8.0 mol% of $TiO_2$. These constituents are all available in the market and of the special grade for tests. 1.9 mg of the diffusing agent or composition paste was applied to each specimen of 250 mg. Care was taken during thermal diffusion so that the diffusing agent or composition would not leave the specimens by evaporation or diffusion. On both major surfaces of the grain boundary layer dielectric ceramic disks, Ag electrodes were formed by a pyrolytic process, whereby the capacitor elements were provided. The dielectric constant $\epsilon_a$ and the dielectric loss tan δ were measured both at 1 KHz. The results were shown in TABLE 2.

TABLE 2

| Specimen No. | Composition of semiconductive ceramic (Specimen No.) | Capacitor characteristics | | | |
|---|---|---|---|---|---|
| | | $\epsilon_a$ | tan δ | $V_b$ (V/mm) | Temperature coefficient of capacitance in % |
| 1011* | 11* | 6500 | 0.0180 | 2600 | 4.6 |
| 1013* | 13* | 3400 | 0.0044 | 3900 | 4.4 |
| 1014 | 14 | 6800 | 0.0035 | 2800 | 3.8 |
| 1016 | 16 | 43000 | 0.0058 | 1200 | 13.5 |
| 1021* | 21* | 3600 | 0.0041 | 3800 | 4.1 |
| 1022 | 22 | 7100 | 0.0038 | 3000 | 4.3 |
| 1024 | 24 | 61000 | 0.0047 | 510 | 14.8 |
| 1025 | 25 | 47000 | 0.0036 | 1100 | 13.3 |
| 1027 | 27 | 7000 | 0.0030 | 3200 | 4.3 |
| 1028* | 28* | 4200 | 0.0027 | 3800 | 3.5 |
| 1031 | 31 | 46000 | 0.0033 | 1150 | 13.0 |
| 1034 | 34 | 6100 | 0.0029 | 3200 | 3.3 |
| 1035* | 35* | 3800 | 0.0027 | 4100 | 3.4 |
| 1044* | 44* | 4600 | 0.0037 | 3500 | 3.0 |
| 1065 | 65 | 45000 | 0.0031 | 1250 | 12.9 |
| 1081* | 81* | 5900 | 0.0200 | 2900 | 3.9 |
| 1086 | 86 | 35000 | 0.0029 | 1400 | 11.7 |
| 1091* | 91* | 3500 | 0.0046 | 3900 | 3.8 |
| 1092 | 92 | 6600 | 0.0040 | 3200 | 4.0 |
| 1095 | 95 | 41000 | 0.0033 | 1300 | 12.6 |
| 1096 | 96 | 27000 | 0.0033 | 2000 | 8.5 |
| 1097 | 97 | 6600 | 0.0031 | 3300 | 3.9 |
| 1098* | 98* | 4000 | 0.0036 | 3700 | 3.7 |
| 1101 | 101 | 38000 | 0.0036 | 1350 | 12.2 |
| 1104 | 104 | 6500 | 0.0034 | 3400 | 3.0 |
| 1105* | 105* | 3700 | 0.0030 | 4200 | 3.1 |
| 1114* | 114* | 4400 | 0.0041 | 3600 | 2.8 |
| 1134 | 134 | 45000 | 0.0052 | 1200 | 11.4 |
| 1135 | 135 | 32000 | 0.0035 | 1450 | 9.6 |
| 1154 | 154 | 30000 | 0.0054 | 1500 | 8.9 |
| 1155 | 155 | 23000 | 0.0040 | 1600 | 5.7 |
| 1171* | 171* | 3900 | 0.0220 | 3100 | 3.0 |
| 1176 | 176 | 11000 | 0.0041 | 4000 | 2.1 |
| 1184 | 184 | 19000 | 0.0045 | 2500 | 4.6 |
| 1185 | 185 | 6700 | 0.0043 | 3300 | 1.7 |
| 1191 | 191 | 8500 | 0.0045 | 3200 | 1.6 |
| 1204* | 204* | 3100 | 0.0052 | 4300 | 1.3 |
| 1224 | 224 | 6200 | 0.0057 | 3500 | 2.9 |
| 1254* | 254* | 4500 | 0.0062 | 3800 | 3.4 |

*Specimens for the sake of comparison.

Specimen Nos. 1011, 1081 and 1171 had a dielectric loss tan δ in excess of 0.01, so that they have no practical value and consequently are excluded from the present invention.

Specimen Nos. 1013, 1021, 1028, 1035, 1044, 1091, 1098, 1105, 1114, 1171, 1204 and 1254 had a dielectric constant $\epsilon_a$ of less than 5,000 so that they have no practical value as a large-capacity capacitor and consequently are excluded from the present invention. Specimen Nos. 1016, 1024, 1025, 1031, 1065, 1086, 1095, 1101 and 1134 showed a dielectric constant $\epsilon_a$ of higher than 35,000, a dielectric loss tan $\delta$ of less than 0.01, a dielectric breakdown voltage $V_b$ of higher than 500 V/mm and a temperature coefficient of capacitance of less than ±15% (YR rating) which are all satisfactory in practical use. Specimen Nos. 1096, 1135, 1154 and 1155 showed a dielectric constant $\epsilon_a$ of higher than 20,000, a dielectric loss tan $\delta$ of less than 0.01, the dielectric breakdown voltage $V_b$ of higher than 700 V/mm and a temperature coefficient of capacitance of less than ±10% (YB rating). The specimens 1014, 1022, 1027, 1034, 1092, 1097, 1104, 1176, 1184, 1185, 1191 and 1224 satisfied the YA ratings of dielectric constant $\epsilon_a$ of higher than 5,000, a dielectric loss tan $\delta$ of less than 0.01, a dielectric breakdown voltage $V_b$ of higher than 700 V/mm and a temperature coefficient of capacitance of less than ±5%.

EXAMPLE 2

Powders of $Bi_2O_3$, $Cu_2O$, $MnO_2$, $B_2O_3$, $La_2O_3$ and $TiO_2$, all of which are available in the market and of the special grade for testing purposes or the like, were proportioned as shown in TABLE 3, wet mixed and added with a suitable amount of terepintine oil or pine resin, whereby the diffusing agents or compositions in the form of paste were prepared.

Thus prepared diffusing pastes were applied to the disks, Specimen No. 25 shown in TABLE 1, which had an average grain size of 24 μm. The amount of the diffusing paste applied to each disk (250 mg) was 1.9 mg in terms of the oxide powder. The semiconductive ceramic disks were then heat-treated at 1150° C. for two hours. Care was taken so that the applied diffusing agents or compositions would not leave the disks by evaporation, diffusion or melting. Ag electrodes were formed on both major surfaces of the grain boundary layer dielectric ceramic disks, whereby capacitor elements were prepared. The dielectric constant $\epsilon_a$, the dielectric loss tan $\delta$, the dielectric breakdown voltage $V_b$ and the temperature coefficient of capacitance were measured at 1 KHz at between 85° C. and −25° C. The results were shown also in TABLE 3.

Except specimen Nos. 2111, 2122, 2318, 2329, 2331, 2332, 2344, 2358 and 2832, the specimens satisfied the YR ratings of a dielectric constant $\epsilon_a$ of higher than 35,000, a dielectric loss tan $\delta$ of less than 0.01, a dielectric breakdown voltage $V_b$ of higher than 500 V/mm and a temperature coefficient of capacitance of less than ±15% or the YB rating of a dielectric constant $\epsilon_a$ higher than 20,000, a dielectric loss tan $\delta$ of less than 0.01, a dielectric breakdown voltage $V_b$ higher than 700 V/mm and a temperature coefficient of capacitance of less than ±10%.

EXAMPLE 3

Following the procedure of the EXAMPLE 2, paste-like diffusing agents or compositions were prepared and applied to the disks, specimen No. 191 shown in TABLE 1, whose average grain size was 8.6 μm. The applied amount was 1.9 mg in terms of an oxide powder

TABLE 3

| Specimen No. | Compositions of diffusing agents in mol % | | | | | | Capacitor characteristics | | | |
|---|---|---|---|---|---|---|---|---|---|---|
| | $Bi_2O_3$ | $Cu_2O$ | $MnO_2$ | $B_2O_3$ | $La_2O_3$ | $TiO_2$ | $\epsilon_a$ | tan $\delta$ | $V_b$ (V/mm) | Temperature coefficient of capacitance in % |
| 2111* | 95.0 | 3.0 | 0.5 | 1.0 | 0.5 | — | 67000 | 0.0056 | 350 | 15.0 |
| 2112 | 93.5 | 4.5 | 0.5 | 1.0 | 0.5 | — | 62000 | 0.0045 | 600 | 14.8 |
| 2114 | 80.0 | 18.0 | 0.5 | 1.0 | 0.5 | — | 53000 | 0.0041 | 800 | 14.3 |
| 2117 | 67.6 | 30.4 | 0.5 | 1.0 | 0.5 | — | 47000 | 0.0035 | 1000 | 14.0 |
| 2120 | 53.0 | 45.0 | 0.5 | 1.0 | 0.5 | — | 36000 | 0.0032 | 1300 | 13.7 |
| 2122* | 48.0 | 50.0 | 0.5 | 1.0 | 0.5 | — | 28000 | 0.0031 | 1500 | 13.5 |
| 2311 | 69.3 | 12.2 | 0.5 | 6.0 | 4.0 | 8.0 | 51000 | 0.0021 | 700 | 13.5 |
| 2313 | 68.7 | 12.1 | 1.2 | 6.0 | 4.0 | 8.0 | 49000 | 0.0030 | 900 | 13.3 |
| 2315 | 67.6 | 12.0 | 2.4 | 6.0 | 4.0 | 8.0 | 47000 | 0.0036 | 1100 | 13.3 |
| 2317 | 66.3 | 11.7 | 4.0 | 6.0 | 4.0 | 8.0 | 44000 | 0.0083 | 1200 | 13.2 |
| 2318* | 65.9 | 11.6 | 4.5 | 6.0 | 4.0 | 8.0 | 42000 | 0.0121 | 1300 | 13.1 |
| 2321 | 71.9 | 12.7 | 2.4 | 1.0 | 4.0 | 8.0 | 49000 | 0.0061 | 1300 | 13.6 |
| 2323 | 70.6 | 12.5 | 2.4 | 2.5 | 4.0 | 8.0 | 48000 | 0.0052 | 1250 | 13.5 |
| 2325 | 69.4 | 12.2 | 2.4 | 4.0 | 4.0 | 8.0 | 47000 | 0.0045 | 1200 | 13.3 |
| 2328 | 65.5 | 11.6 | 2.4 | 8.5 | 4.0 | 8.0 | 45000 | 0.0027 | 700 | 13.2 |
| 2329* | 63.4 | 11.2 | 2.4 | 11.0 | 4.0 | 8.0 | 43000 | 0.0021 | 400 | 13.0 |
| 2331* | 71.1 | 12.5 | 2.4 | 6.0 | — | 8.0 | 57000 | 0.0041 | 1350 | 15.2 |
| 2332* | 70.9 | 12.5 | 2.4 | 6.0 | 0.2 | 8.0 | 56000 | 0.0040 | 1350 | 15.1 |
| 2333 | 70.6 | 12.5 | 2.4 | 6.0 | 0.5 | 8.0 | 54000 | 0.0039 | 1300 | 14.7 |
| 2334 | 70.2 | 12.4 | 2.4 | 6.0 | 1.2 | 8.0 | 51000 | 0.0037 | 1300 | 14.3 |
| 2336 | 69.4 | 12.2 | 2.4 | 6.0 | 2.0 | 8.0 | 49000 | 0.0036 | 1200 | 13.8 |
| 2340 | 64.3 | 11.3 | 2.4 | 6.0 | 8.0 | 8.0 | 39000 | 0.0035 | 900 | 12.0 |
| 2343 | 56.6 | 10.0 | 2.4 | 6.0 | 17.0 | 8.0 | 31000 | 0.0034 | 700 | 9.7 |
| 2344* | 52.4 | 9.2 | 2.4 | 6.0 | 22.0 | 8.0 | 24000 | 0.0032 | 500 | 7.5 |
| 2351 | 74.5 | 13.1 | 2.4 | 6.0 | 4.0 | — | 49000 | 0.0033 | 1300 | 14.3 |
| 2354 | 71.1 | 12.5 | 2.4 | 6.0 | 4.0 | 4.0 | 48000 | 0.0034 | 1200 | 13.8 |
| 2357 | 60.0 | 10.6 | 2.4 | 6.0 | 4.0 | 17.0 | 37000 | 0.0037 | 800 | 12.6 |
| 2358* | 55.8 | 9.8 | 2.4 | 6.0 | 4.0 | 22.0 | 26000 | 0.0039 | 500 | 11.9 |
| 2825 | 45.5 | 8.0 | 4.0 | 8.5 | 17.0 | 17.0 | 39000 | 0.0045 | 800 | 12.9 |
| 2827 | 37.5 | 16.0 | 4.0 | 8.5 | 17.0 | 17.0 | 35000 | 0.0042 | 900 | 11.3 |
| 2829 | 29.5 | 24.0 | 4.0 | 8.5 | 17.0 | 17.0 | 30000 | 0.0046 | 1000 | 9.6 |
| 2831 | 8.5 | 45.0 | 4.0 | 8.5 | 17.0 | 17.0 | 23000 | 0.0049 | 1200 | 8.3 |
| 2832* | 3.5 | 50.0 | 4.0 | 8.5 | 17.0 | 17.0 | 19000 | 0.0055 | 1300 | 7.5 |

*Specimens used for the sake of comparison.

for each disk of 250 mg. The disks were then heat-treated at 1000° C. for two hours. Care was taken so that the applied diffusing agents or compositions would not leave the disks. Silver electrodes were attached to the both major surfaces of the grain boundary layer dielectric ceramic disks and following the procedure of EXAMPLE 2, the characteristics were measured. The results were shown in TABLE 4.

TABLE 4

| Specimen No. | Compositions of diffusing agents in mol % | | | | | | Capacitor characteristics | | | |
|---|---|---|---|---|---|---|---|---|---|---|
| | $Bi_2O_3$ | $Cu_2O$ | $MnO_2$ | $B_2O_3$ | $La_2O_3$ | $TiO_2$ | $\epsilon_a$ | tan δ | $V_b$ (V/mm) | coefficient of capacitance in % |
| 5331* | 71.1 | 12.5 | 2.4 | 6.0 | — | 8.0 | 10400 | 0.0056 | 4000 | 5.6 |
| 5332* | 70.9 | 12.5 | 2.4 | 6.0 | 0.2 | 8.0 | 10300 | 0.0055 | 3900 | 5.4 |
| 5333 | 70.6 | 12.5 | 2.4 | 6.0 | 0.5 | 8.0 | 10100 | 0.0053 | 3900 | 3.7 |
| 5334 | 70.2 | 12.4 | 2.4 | 6.0 | 1.0 | 8.0 | 9700 | 0.0050 | 3800 | 2.4 |
| 5336 | 69.4 | 12.2 | 2.4 | 6.0 | 2.0 | 8.0 | 9200 | 0.0047 | 3600 | 1.9 |
| 5338 | 67.6 | 12.0 | 2.4 | 6.0 | 4.0 | 8.0 | 8500 | 0.0045 | 3200 | 1.6 |
| 5340 | 64.3 | 11.3 | 2.4 | 6.0 | 8.0 | 8.0 | 6900 | 0.0043 | 2600 | 1.4 |
| 5343 | 56.6 | 10.0 | 2.4 | 6.0 | 17.0 | 8.0 | 5300 | 0.0041 | 1900 | 1.2 |
| 5344* | 52.4 | 9.2 | 2.4 | 6.0 | 22.0 | 8.0 | 4200 | 0.0039 | 1100 | 1.1 |
| 5351 | 74.5 | 13.1 | 2.4 | 6.0 | 4.0 | — | 9100 | 0.0040 | 3700 | 3.9 |
| 5354 | 71.1 | 12.5 | 2.4 | 6.0 | 4.0 | 4.0 | 8900 | 0.0043 | 3500 | 2.6 |
| 5357 | 60.0 | 10.6 | 2.4 | 6.0 | 4.0 | 17.0 | 6300 | 0.0048 | 2100 | 1.0 |
| 5358* | 55.8 | 9.8 | 2.4 | 6.0 | 4.0 | 22.0 | 4500 | 0.0051 | 1200 | 0.7 |
| 5576 | 64.2 | 11.3 | 4.0 | 8.5 | 4.0 | 8.0 | 6800 | 0.0079 | 2400 | 1.5 |
| 5577* | 61.6 | 10.9 | 4.5 | 11.0 | 4.0 | 8.0 | 5200 | 0.0116 | 1500 | 1.4 |

*Specimens for the sake of comparison.

Except Specimen Nos. 5331, 5332, 5344, 5358 and 5577, the specimens showed a dielectric constant $\epsilon_a$ higher than 5000, a dielectric loss tan δ of less than 0.01, a dielectric breakdown voltage $V_b$ higher than 700 V/mm and a temperature coefficient less than ±5%. Thus they satisfied the YA rating.

EXAMPLE 4

The constituents used in EXAMPLE 1 and $SiO_2$ powder, which is available in the market and of the special grade for testing purpose or the like, were proportioned as shown in TABLE 5 and following the procedure of EXAMPLE 1, the disks or "compacts" were formed. The disks were heat-treated in the air at 1000° C. and then sintered at a predetermined temperature between 1390° C. and 1330° C. for four hours in an atmosphere consisting of 95% of $N_2$ and 5% of $H_2$, whereby the semiconductive ceramic disks about 12.5 mm in diameter and about 0.4 mm in thickness were obtained. Following the procedure of EXAMPLE 1, the average grain sizes were measured. The results are also shown in TABLE 5.

TABLE 5

| | Semiconductive Ceramic | | | | | Capacitor characteristics | | | |
|---|---|---|---|---|---|---|---|---|---|
| Specimen No. | Semiconductive ceramic compositions | | $SiO_2$ in mol parts | Sintering temperature (°C.) | Average grain size in μ | $\epsilon_a$ | tan δ | $V_b$ (V/mm) | Temperature coefficient of capacitance in % |
| | Major constituents (100 mol parts) | | | | | | | | |
| 8511 | | | — | 1390 | 24 | 47000 | 0.0036 | 1100 | 13.3 |
| 8512 | | | 0.1 | 1390 | 21 | 42000 | 0.0034 | 1250 | 13.1 |
| 8521 | | | 0.2 | 1390 | 18 | 36000 | 0.0033 | 1300 | 12.0 |
| 8522 | SrO | 49.75 mol % | 0.2 | 1370 | 18 | 37000 | 0.0030 | 1350 | 12.2 |
| 8523 | | | 0.2 | 1350 | 17.5 | 35000 | 0.0044 | 1100 | 12.1 |
| 8531 | $TiO_2$ | 55.05 mol % | 0.5 | 1390 | 14 | 26000 | 0.0031 | 1500 | 9.7 |
| 8541 | | | 1.0 | 1390 | 10.1 | 15000 | 0.0032 | 1800 | 3.8 |
| 8542 | $Nb_2$ | 0.20 mol % | 1.0 | 1360 | 10.0 | 16000 | 0.0029 | 1800 | 3.9 |
| 8543 | | | 1.0 | 1340 | 9.3 | 12000 | 0.0039 | 1600 | 3.6 |
| 8551 | Total | 100 mol % | 1.5 | 1390 | 7.6 | 7100 | 0.0034 | 2200 | 3.2 |
| 8561 | | | 2.0 | 1390 | 5.4 | 5200 | 0.0037 | 2600 | 2.7 |
| 8571* | | | 2.5 | 1290 | 4.7 | 4600 | 0.0040 | 3000 | 2.4 |
| 8811 | SrO | 3980 mol % | — | 1390 | 23 | 45000 | 0.0052 | 1200 | 11.4 |
| 8812 | | | 0.1 | 1390 | 21 | 40000 | 0.0049 | 1300 | 11.0 |
| 8821 | CaO | 10.00 mol % | 0.2 | 1390 | 17 | 32000 | 0.0047 | 1400 | 9.8 |
| 8831 | $TiO_2$ | 50.00 mol % | 0.5 | 1390 | 13 | 23000 | 0.0046 | 1500 | 7.7 |
| 8832 | | | 0.5 | 1360 | 13 | 25000 | 0.0041 | 1500 | |
| 8841 | $Nb_2O_3$ | 0.20 mol % | 1.0 | 1390 | 8.5 | 8400 | 0.0048 | 1900 | 3.6 |
| 88851 | Total | 100 mol % | 1.5 | 1390 | 6.3 | 6100 | 0.0051 | 2300 | 2.9 |
| 8861 | | | 2.0 | 1390 | 5.1 | 5100 | 0.0055 | 2700 | 2.3 |
| 8871* | | | | 1390 | 4.3 | 4400 | 0.0060 | 3100 | 1.9 |

*Specimens for the sake of comparison.

The specimen Nos. 8571 and 8871 had the $SiO_2$ constituent in excess of 2 mol parts based on 100 mol parts of the main constituents or composition (consisting of three or four of SrO, CaO, $TiO_2$ and $Nb_2O_5$) so that the grain growth was inhibited and consequently they had the average grain size of less than 5 μm. The effect of the $SiO_2$ constituent for facilitating the sintering is clear from Specimen Nos. 8521, 8522 and 8523. That is, even when the sintering temperature was dropped from 1390° C. to 1350° C., the average grain size remained almost unchanged. Specimen Nos. 8541, 8542 and 8543 containing 1 mol part of $SiO_2$ and Specimen Nos. 8831 and 8832 containing 0.5 mol parts of $SiO_2$ showed the same tendency.

Following the procedure of EXAMPLE 1, specimens whose average grain size was in excess of 12 $\mu m$ were coated with the diffusion pastes and heat-treated at 1150° C. for two hours. In like manner, the specimens whose average grain size was less than 12 $\mu m$ were coated with the diffusing pastes and heat-treated at 1000° C. for two hours. Also following the procedure of EXAMPLE 1, the grain boundary layer dielectric ceramic disk elements were formed with Ag electrodes and their characteristics were measured. The results are also shown in TABLE 5.

Except Specimen Nos. 8571 and 8871, all the specimens (8511, 8512, 8521, 8522, 8523, 8811 and 8812) satisfied the YR rating of a dielectric constant $\epsilon_a$ higher than 35,000, a dielectric loss tan $\delta$ less than 0.01, a dielectric breakdown voltage $V_b$ higher than 500 V/mm and a temperature coefficient of capacitance less than ±15%. Especially Specimen Nos. 8531, 8821, 8831 and 8832 satisfied the YB rating of a dielectric constant $\epsilon_a$ higher than 20,000, a dielectric loss tan $\delta$ less than 0.01, a dielectric breakdown voltage $V_b$ of higher than 700 V/mm and a temperature coefficient of capacitance less than ±10%. Furthermore, specimen Nos. 8541, 8542, 8543, 8551, 8561, 8841, 8851 and 8861 satisfied the YA rating of a dielectric constant $\epsilon_a$ higher than 5,000, a dielectric loss tan $\delta$ less than 0.01, a dielectric breakdown voltage $V_b$ higher than 700 V/mm and a temperature coefficient less than ±5%.

What is claimed is:

1. A grain boundary layer dielectric ceramic composition comprising semiconductive ceramic grains having a composition of 50.23 to 49.47 mol% of SrO, 49.72 to 50.23 mol% of $TiO_2$, and 0.05 to 0.3 mol% of $Nb_2O_5$, substantially each of said grains being surrounded by a grain boundary layer of dielectric material formed by grain boundary diffusion of a mixture consisting of 93.5 to 8.5 mol% of $Bi_2O_3$, 4.5 to 45 mol% of $Cu_2O$, 0.5 to 4 mol% of $MnO_2$, 1 to 8.5 mol% of $B_2O_3$, 0.5 to 17 mol% of $La_2O_3$, and less than 17 mol% of $TiO_2$, characterized in having a temperature coefficient of capacitance lower than said composition recited above absent $La_2O_3$ in said grain boundary diffusion mixture.

2. A grain boundary layer dielectric ceramic composition comprising semiconductive ceramic grains having a composition of 50.23 to 49.47 mol% of SrO and CaO, wherein the amount of CaO is less than 22.26 mol%, 49.72 to 50.23 mol% of $TiO_2$ and 0.05 to 0.3 mol% of $Nb_2O_5$, substantially each of said grains being surrounded by a grain boundary layer of dielectric material formed by grain boundary diffusion of a mixture consisting of 93.5 to 8.5 mol% of $Bi_2O_3$, 4.5 to 45 mol% of $Cu_2O$, 0.5 to 4 mol% of $MnO_2$, 1 to 8.5 mol% of $B_2O_3$, 0.5 to 17 mol% of $La_2O_3$, and less than 17 mol% of $TiO_2$, characterized in having a temperature coefficient of capacitance lower than said composition recited above absent $La_2O_3$ in said grain boundary diffusion mixture.

3. A grain boundary layer dielectric ceramic composition comprising semiconductive ceramic grains having a composition of 100 mol parts of a mixture of 50.23 to 49.47 mol% of SrO and CaO, wherein the amount of CaO is less than 22.26 mol%, 49.72 to 50.23 mol% of $TiO_2$, and 0.05 to 0.3 mol% of $Nb_2O_5$, and containing $SiO_2$ in an amount less than 2 mol parts of $SiO_2$ to 100 mol parts of said mixture, substantially each of said grains being surrounded by a grain boundary layer of dielectric material formed by a grain boundary diffusion of a mixture consisting of 93.5 to 8.5 mol% of $Bi_2O_3$, 4.5 to 45 mol% of $Cu_2O$, 0.5 to 4 mol% of $MnO_2$, 1 to 8.5 mol% of $B_2O_3$, 0.5 to 17 mol% of $La_2O_3$, and less than 17 mol% of $TiO_2$, characterized in having a temperature coefficient of capacitance lower than said composition recited above absent $La_2O_3$ in said grain boundary diffusion mixture.

* * * * *